United States Patent [19]
Amagami et al.

[11] 3,989,916
[45] Nov. 2, 1976

[54] INDUCTION HEATING APPLIANCE FOR A COOKING UTENSIL

[75] Inventors: Keizo Amagami; Hazime Mori; Hideyuki Kominami; Yukio Hirai, all of Kadoma, Japan

[73] Assignee: Matsushita Electric Industrial Co., Ltd., Kadoma, Japan

[22] Filed: Aug. 30, 1974

[21] Appl. No.: 502,214

Related U.S. Application Data
[63] Continuation-in-part of Ser. No. 415,543, Nov. 14, 1973, abandoned.

[30] Foreign Application Priority Data
Nov. 15, 1972 Japan .............................. 47-131890[U]
Nov. 15, 1972 Japan .............................. 47-114985[U]
Nov. 15, 1972 Japan .............................. 47-114987[U]
Nov. 15, 1972 Japan .............................. 47-114988[U]
Aug. 9, 1973 Japan ................................ 48-94313[U]

[52] U.S. Cl. .......................... 219/10.49; 719/10.77; 719/10.79
[51] Int. Cl.² .......................................... H05B 5/04
[58] Field of Search ........... 219/10.49, 10.75, 10.77, 219/10.79

[56] References Cited
UNITED STATES PATENTS

| | | | |
|---|---|---|---|
| 1,935,047 | 11/1933 | Dreyfus | 219/10.79 |
| 3,637,970 | 1/1972 | Cunningham | 219/10.77 |
| 3,704,357 | 11/1972 | Moulin | 219/10.79 |
| 3,710,062 | 1/1973 | Peters | 219/10.49 |
| 3,781,503 | 12/1973 | Harnden et al. | 219/10.79 |
| 3,786,219 | 1/1974 | Kornrumpf et al. | 219/10.49 |
| 3,786,222 | 1/1974 | Harnden et al. | 219/10.49 |
| 3,806,688 | 4/1974 | MacKenzie et al. | 219/10.49 |
| 3,821,509 | 6/1974 | Amagami et al. | 219/10.77 |
| 3,823,296 | 7/1974 | Amagami et al. | 219/10.77 |
| 3,898,410 | 8/1975 | Peters | 219/10.49 |

FOREIGN PATENTS OR APPLICATIONS
684,819  12/1952  United Kingdom ............... 219/10.79

*Primary Examiner*—Bruce A. Reynolds

[57] ABSTRACT

An electrically conductive material is heated by Joule heat generated by an eddy current loss and a hysteresis loss which are invited by a magnetic field injuced in the material by a current flowing in proximity to the material. The power output of the heating equipment is varied either electrically or mechanically while maintaining the inductance of the induction heating coil substantially constant.

10 Claims, 16 Drawing Figures

INDUCTION HEATING APPLIANCE FOR A COOKING UTENSIL

This invention is continuation-in-part of continuation-in-partof application Ser. No. 415,543 filed on Nov. 14, 1973, Now abandoned.

The present invention relates to induction heaters and particularly to means to control a power input to be supplied to a material to be heated.

In an induction heating process, a varying magnetic field is built up by an electric current having suitable frequencies. A material to be heated, which is electrically conductive, is positioned in proximity to the current so that the varying magnetic field produces an eddy current in the material to be heated. The temperature of the material is thus increased by Joule heat which is generated by an eddy current loss in the material. The induction heating equipment of this nature will find a wide variety of practical applications for industrial purposes or in kitchen utensils but the equipment will be herein described, by way of example, as the kitchen ovens or ranges for cooking food.

Various kinds of induction heaters as for kitchen utensils have thus far been proposed. Typical examples of such prior art induction heaters are such that the material to be heated is placed on an electrically insulating cooking plate under which an induction heating coil of a spiral form is positioned. In the induction heaters of this construction, the temperature of the material to be heated tends to decrease in its central and outer peripheral areas under the influence of the magnetic field and the radiation of heat. While this will invite no problem in cooking stew or other food having excellent temperature distribution problems are encountered in cooking food such as an egg or a beefsteak because heat is not distributed uniformly throughout the food so that the food tends to be cooked irregularly or only locally.

A first object of the present invention is, therefore, to provide improved induction heater capable of uniformly cooking food irrespective of the temperature distribution in the food.

An induction heater usually uses an inverter as a high-frequency oscillator. When, therefore, the inductance of the material to be heated varies, then the oscillation frequency is altered so that it becomes difficult to maintain the proper oscillation. A second object of the present invention is to provide an induction heater which is adapted to deliver a power output controlled to be optimum for the material to be heated and in which the oscillation frequency of the inverter is maintained substantially constant even when the inductance of the material to be heated is changed.

Where the induction heater is so designed that the power output of the equipment is varied by varying the distance between the induction heating coil and the material to be heated, metal members underlying the induction heating coil are heated excessively as the coil is lowered and thus brings about a considerable loss in the power output. A third object of the present invention is to provide an induction heater in which the induction heating coil can be raised or lowered by a simple mechanism and in which the metal members underlying the induction heating coil are prevented from being heated even when the coil is moved to its lowermost position.

A fourth object of the present invention is to provide an induction heater having a plurality of induction heating coils which can be energized in stable conditions independently of each other and irrespective of the presence or absence of a material or materials to be heated.

In accordance with the present invention, these objects are accomplished by the provision of an induction heater equipment which comprises rectifying means for rectifying a supplied alternating current, a gate controlled rectifier and a filter inductor which are connected in series to the rectifying means, a serial combination of a flow reversing capacitor and a flow reversing inductor connected in parallel to the gate controlled rectifier for producing a high-frequency power, the flow reversing capacitor thus acting as a high-frequency power source, an induction heating unit having at least one spiral induction heating coil connected to the high-frequency power source for being energized by the high-frequency power therefrom, and an inductance compensation means which is operative to maintain substantially constant the inductance of the induction heating unit. The induction heating unit may comprise a plurality of spiral induction heating coils and switching means for selectively connecting the coils to the high-frequency power source provided by the flow-reversing capacitor. In this instance, the induction heating coils may be arranged either in concentrical and coplanar relation with one coil surrounded by another or in concentrical and vertically aligned relation with one coil overlying or superposed on another. Where the induction heating coils are arranged in coplanar relation, not only the amount of power output of the induction heating unit but the distribution of the power output may be varied through selective connection of the coils to the high-frequency power source. Where, on the other hand, the coils are arranged in vertically aligned relation, not only the amount of power out of the induction heating unit but the current density applied to the material to be heated may be varied through selective connection of the coils to the high-frequency power source.

The inductance compensation means may be realized in numerous manners. One preferred example of the inductance compensation means comprises an inductance coil connected in series to the induction heating coil or coils and the high-frequency power source. Another preferred example is realized where the induction heating unit comprises a plurality of induction heating coils and switching means for selectively connecting the coils to the high-frequency power source. In this instance, the inductance compensation means comprises an inductance coil connected in series to the induction heating coils and switching means cooperating with the switching means of the induction heating unit for carrying the inductance of the inductance coil in accordance with the induction heating coil or coils which are selected by the switching means of the induction heating unit. A third preferred example of the inductance compensation means comprises moving means for moving the induction heating coil or coils relative to the material to be heated and a non-magnetic metal plate positioned below the induction heating coil or coils for supporting the moving means, the moving means being preferably formed of electrically isolating material. To prevent the non-magnetic metal plate from being excessively heated when the induction heating coil is moved close to the plate, the inductance compensation means may further comprise at least one ferromagnetic member which is positioned on the non-magnetic plate. To enable the induction heating coil to be completely de-energized when the coil is moved to a position remotest from the material to be heated, the inductance compensation means may further comprise a dummy coil which is connected in parallel to the induction heating coil and a switch for usually connecting the induction heating coil to the high-frequency power source and for disconnecting the coil from the power source and, instead, connecting the dummy-coil to the power source when the induction heating coil is moved to a position remotest from the material to be heated. Still furthermore, the inductance compensation means may comprise a non-magnetic member surrounding at a spacing the induction heating coil.

A fourth preferred example of the inductance compensation means of the induction heating equipment according to the present invention comprises a current transformer which has a primary coil connected to the high-frequency power source and at least one secondary coil connected to the induction heating coil, wherein the current transformer is so arranged as to have a coefficient of coupling which is variable depending upon the inductance of the material to be heated.

Where the induction heating unit has incorporated therein two or more induction heating coils, each of the coils may be combined with its respective filter inductor so that a plurality of combinations of the induction heating coil and the filter inductor are connected in parallel to the flow-reversing capacitor over respective switches. Where such an arrangement is preferred, additons flow-reversing capacitors may be provided so that each of the serial combinations of the induction heating coil and the filter inductor is shunted by each of the additional flow-reversing capacitors.

Other features and advantages of the induction heating equipment embodying the present invention will become more apparent from the following description taken in conjunction with the accompanying drawings in which like reference numerals designate similar parts and elements in some figures and in which.

Reference will now be made to the accompanying drawings, first to FIG. 1 which illustrates an overall circuit arrangement of an induction heater according to the present invention. An a.c. power source 20 has positive and negative terminals connected over an actuating switch 22 to a full-wave rectifier 24 of a known construction using, for example, a combination of diodes connected in a bridge form. One terminal of the full-wave rectifier 24 is connected through a positive bus line 28 and a filter inductor 26 to a positive terminal of a chopper type inverter 30 and the other terminal of the rectifier is connected to a negative bus line 32 of the inverter 30. The inverter 30 includes a combination of a silicon controlled rectifier 34 and a diode 36 which are connected in parallel between the positive and negative bus lines 28 and 32, respectively. The silicon controlled rectifier 34 has an anode terminal connected to the positive bus line 28 and a cathode terminal connected to the negative bus line 32. The diode 36, which is in shunting relationship to the silicon controlled rectifier 34, has a cathode terminal connected to the positive bus line 28 and an anode terminal connected to the negative bus line 32. A series combination of a commutating capacitor 38 and a resonance inductor 40 is connected between the positive and negative bus lines 28 and 32 in parallel to the combination of the silicon controlled rectifier 34 and the diode 36. The combination of the capacitor 38 and the inductor 40 constitutes a resonance circuit in the chopper type inverter 30. A resonance capacitor 42 and an induction heating unit 44 are connected in series across the commutating capacitor 38 in a manner that the capacitor 42 is connected to a node between the capacitor 38 and the inductor 40. The detailed configuration and arrangement of the heating unit 44 will be described later.

When, in operation, the actuating switch 22 is closed, a d.c. current which is rectified by the full-wave rectifier 24 and smoothed by a smoothing capacitor, not shown, is supplied to the inverter 30 and, simultaneously, trigger signals are fed to the gate terminal of the silicon controlled rectifier 34 at timed intervals. When the silicon controlled rectifier 34 is thus triggered, the terminal voltage of the silicon controlled rectifier 34 becomes approximately zero volts and, at the same time, the silicon controlled rectifier 34 and the diode 36 are supplied with an oscillating current which is determined by the combined impedance of the commutating capacitor 38, the resonance inductor 40, the commutating capacitor 42, and the induction heating unit 44. A high-frequency voltage having frequencies determined by the cycles of the trigger signals supplied to the silicon controlled rectifier 34 is generated across the terminal electrodes of the commutating capacitor 38 by the oscillating current. The commutating capacitor 38 now acts as a power source supplying to the induction heating unit 44 a high-frequency oscillating current which is dictated by the inductance of the heating unit 44 and the resonance capacitor 42. The heating unit 44 is consequently energized to start induction heating of a material to be cooked. As will be described in detail, the induction heating unit 44 is adapted not only to heat the material to be cooked but to provide an approximately constant inductance irrespective of the variation in the power output of the heating unit and/or the inductance of the material to be cooked.

Figure 1:
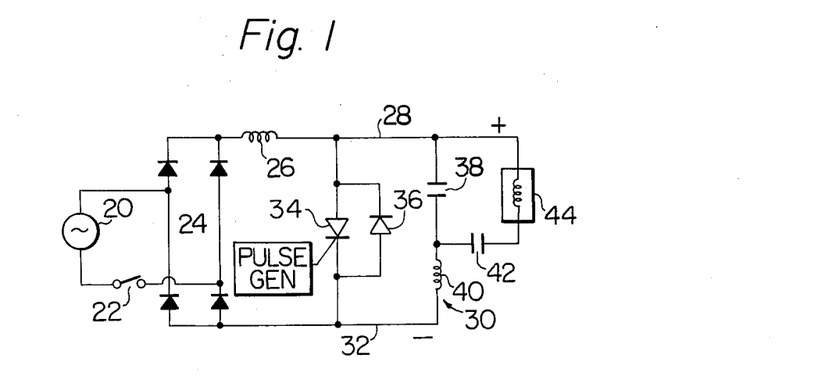
FIG. 1 is a schematic view showing an overall circuit arrangement of an induction heater according to the present invention.
Figure 2:
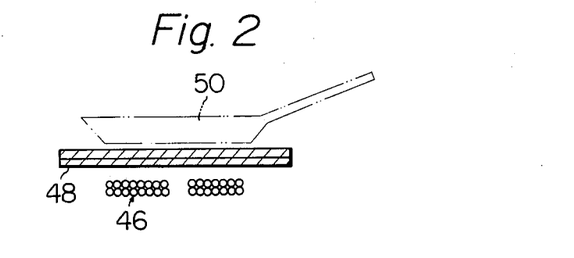
FIG. 2 is a sectional view of a heating unit of an induction heater according to the present invention.

FIG. 2 illustrates a usual coil arrangement of the heating unit 44 of the induction heating equipment shown in FIG. 1. The coil arrangement, generally indicated by 46, is positioned underneath a stationary cooking plate 48 of heat-resistive insulator. During operation, an object to be heated, such as for example, a frying pan 50, is mounted on the cooking plate 48 so that the eddy current loss caused in the frying pan 50 by the magnetic field built up by the coil arrangement 46 brings about self-calefaction of the frying pan 50. It is thus important that the object to be heated such as the frying pan 50 be formed of an electrically conductive material so that an eddy current is created by the magnetic field established by the coil arrangement 46.

Figure 3:
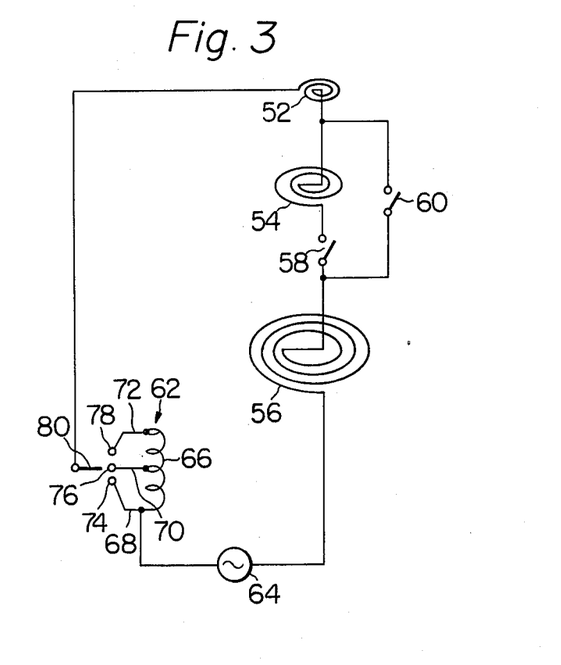
FIG. 3 is a schematic view showing a first preferred example of an induction heating unit to be incorporated in the circuit arrangement of FIG. 1.
Figure 4:
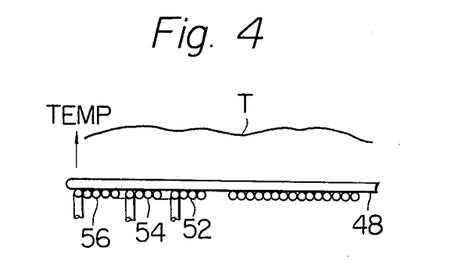
FIG. 4 is a sectional view showing the configuration of the induction heating coils incorporated in the induction heating unit illustrated in FIG. 3.

A first preferred example of the coil arrangement 46 is illustrated in FIGS. 3 and 4. Referring to FIGS. 3 and 4, the coil arrangement comprises first, second and third spiral coils 52, 54 and 56, respectively, which are arranged in concentric and substantially coplanar relationship under the cooking plate 48. The first or innermost coil 52 is surrounded by the second or intermediate coil 54, which in turn is surrounded by the third or outermost coil 56. One terminal of the second coil 54 is connected to the first coil 52 and the other terminal thereof is connected through a first switch 58 to the third coil 56. The second coil 56 and the switch 58 are shunted by a second switch 60. The first and third coils 52 and 56 have respective leads which are connected together across an inductance compensation circuit 62 and a source 64 of a high-frequency oscillating current. The high-frequency oscillating current source 64 is herein assumed to be the combination of the current-flow reversing capacitor 38 and the resonance capacitor 42 of the circuit illustrated in FIG. 1.

The inductance compensation circuit 62 is intended to maintain the resonance frequency of the inverter 30 (FIG. 1) unchanged and accordingly the inductance of the heating unit constant even though the inductance of the material to be cooked changes. The inductance compensation circuit 62 comprises a coil 66 from which first, second and third terminals 68, 70 and 72, respectively, are led. The first and third terminals 68 and 72 are led from the opposite ends of the coil 66 while the second terminal 70 is led from an intermediate point of the coil 66 as shown. The inductance compensation circuit 62 further comprises first, second and third stationary contacts 74, 76 and 78 which are connected to the terminals 68, 70 and 72, respectively, of the coil 66 and a movable contact 80 positioned in association with these stationary contacts and is connected to the lead of the first induction heating coil 52. The first terminal 68 of the coil 66 is connected across the current source 64 to the lead of the third induction heating coil 56. The movable contact 80 is mechanically interlocked with the first and second switches 58 and 60 so that the movable contact is connected to the first stationary contact 74 when the first switch 58 is closed and the second switch 60 is open and the movable contact is connected to the second stationary contact 76 when the first switch 58 is open and the second switch 60 is closed. When both the first and second switches 58 and 60 are open, the movable contact 80 is connected to the third stationary contact 78.

When it is desired that stew or other materials having excellent heat distribution are cooked, the first switch 58 should be closed and the second switch 60 open so that a closed circuit is established by the first, second and third induction heating coils 52, 54 and 56 and the first stationary contact 74 and the movable contact 76. All the induction heating coils 52, 54 and 56 are consequently energized from the high-frequency oscillating current source 64 with the coil 66 of the inductance compensation circuit 62 kept de-energized whereby the material can be cooked with a maximum power output of the induction heating equipment. When, on the other hand, a material such as an egg or a beefsteak is to be cooked which is subject to relatively poor heat distribution, the second switch 60 should be closed and the first switch 58 opened so that the first and third induction heating coils 52 and 56 are energized from the current source 64 and simultaneously the coil 66 of the inductance compensation circuit 62 is energized in part with the movable contact 80 connected to the second stationary contact 76. Under these conditions, the material to be cooked is heated over its central and outer peripheral areas which tend to be cooled under the influence of the localized radiation of heat and the magnetic flux cutting thereacross. The material to be cooked will thus be subject, in it entirety, to a substantially uniform temperature distribution throughout its area as indicated by curve T in FIG. 4.

Figure 5:
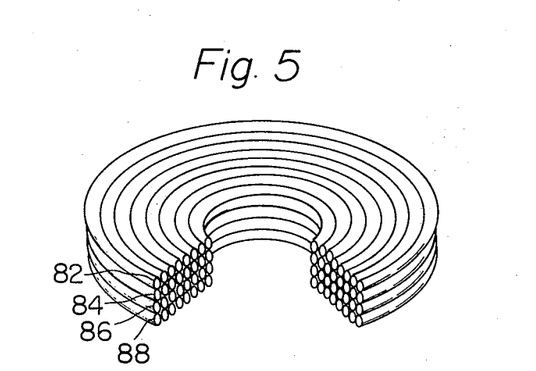
FIG. 5 is a partially cut-away perspective view showing the configuration of induction heating coils in a second preferred example of an induction heating unit.
Figure 6:
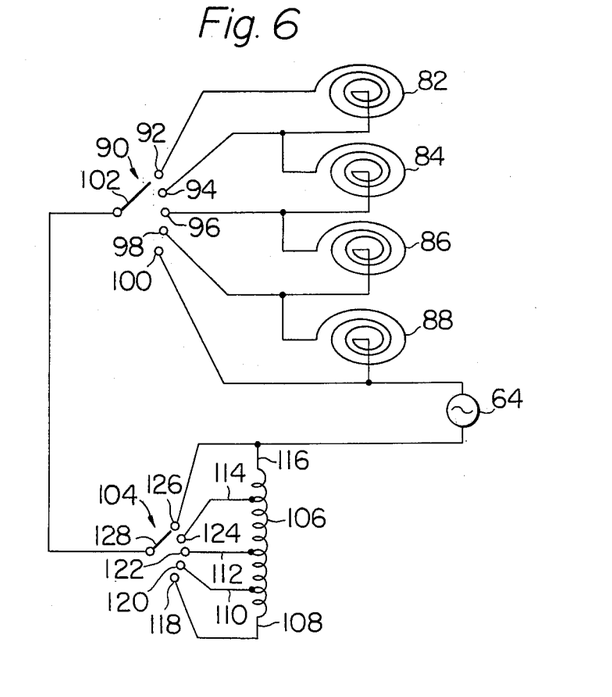
FIG. 6 is a schematic view showing a circuit arrangement of the second preferred example of an induction heating unit.

A second preferred example of the coil arrangement of an induction heating unit of the equipment according to the present invention is illustrated in FIGS. 5 and 6. While the coils are arranged in concentrical and substantially coplanar relationship in the coil arrangement above described, the coil arrangement herein shown has first, second, third and fourth spiral coils 82, 84, 86 and 88 which have substantially equal diameters and which are in concentrical and vertically superposed relation. The coils 82, 84, 86 and 88 are herein assumed to be arranged vertically from the top to the bottom in this sequence as seen in FIG. 5 and are electrically connected in series to the high-frequency oscillating current source 64 as seen in FIG. 6. A switching circuit 90 has first to fifth stationary contacts 92 to 100 and a movable contact 102 which is positioned engageably with the stationary contacts 92 to 100. The first stationary contact 92 is connected to the lead of the first coil 82. The second stationary contact 94 is connected to the line interconnecting the first and second coils 82 and 84, respectively. The third stationary contact 96 is connected to the line interconnecting the second and third coils 84 and 86, respectively. The fourth stationary contact 98 is connected to the line interconnecting the third and fourth coils 86 and 88, respectively. The fifth stationary contact 100 is connected to the lead of the fourth coil 88 and accordingly to the high-frequency oscillating current source 64. The movable contact 102 is connected to the current source 64 across an inductance compensation circuit 104. The inductance compensation circuit 104, which is provided to maintain substantially constant the inductance of the induction heating unit as previously mentioned, comprises a coil 106 to which first, second, third, fourth and fifth terminals 108, 110, 112, 114 and 116, respectively, are connected. Of these terminals, the first and fifth terminals 108 and 116 are connected to opposite ends of the coil 106 and the third terminal 112 is connected to an intermediate or substantially central point of the coil 106. The second terminal 110 is connected to a point intervening between the intermediate or central point of the coil 106 and the end of the coil leading to the first terminal 108, while the fourth terminal 114 is connected to point intermediate between the intermediate or central point of the coil and the end of the coil leading to the fifth terminal 116. The inductance compensation circuit 104 further comprises first to fifth stationary contacts 118 to 126 connected to the first to fifth terminals 108 to 116, respectively, of the coil 106 and a movable contact 128 which is positioned engageably with the stationary contacts 118 to 126 and which is connected to the movable contact 102 of the switching circuit 90. The fifth terminal of the coil 106 is connected to the high-frequency oscillating current source 64.

The movable contact 102 of the switching circuit 90 is mechanically interlocked with the movable contact 128 of the inductance compensation circuit 104 so that, when the movable contact 102 is connected in turn to the stationary contacts 92 to 100 in the switching circuit 90, then the movable contact 128 is also connected in turn to the stationary contacts 126 to 118, respectively. When, thus, the movable contact 102 is connected to the first stationary contact 92 in the switching circuit 90 and accordingly the movable contact 128 is connected to the fifth stationary contact 126 in the induction compensation circuit 104, then all the induction heating coils 82, 84, 86 and 88 are energized from the high-frequency oscillating current source 64 and the coil 106 of the inductance compensation circuit 104 is disconnected from the current 64, providing a maximum power output of the induction heating unit. When the movable contact 102 is connected to the second stationary contact 94 in the switching circuit 90 and the movable contact 128 is connected to the fourth stationary contact 124 in the inductance compensation circuit 104, then the second, third and fourth induction heating coils 84, 86 and 88 are energized from the high-frequency oscillating current source 64 and simultaneously the coil 106 of the inductance compensation circuit 104 is energized in its section intervening between the fourth and fifth terminals 114 and 116, respectively. When the movable contact 102 is connected to the third stationary contact 96 in the switching circuit 90 and accordingly the movable contact 128 is connected to the third stationary contact 122 in the inductance compensation circuit 104, then the lower two, viz., the third and fourth induction heating coils 86 and 88, respectively, are energized from the high-frequency oscillating current source 64 and simultaneously the coil 106 of the inductance compensation circuit 104 is energized in its section intervening between the third and fifth terminals 112 and 116, respectively, of the coil 106. When, furthermore, the movable contact 102 is connected to the fourth stationary contact 98 in the switching circuit 90 and accordingly the movable contact 128 is connected to the second stationary contact 120 in the inductance compensation circuit 104, then only the fourth or lowermost induction heating coil 88 is energized from the high-frequency oscillating current source 64 and simultaneously the coil 106 of the inductance compensation circuit 104 is energized in its section intervening between the second and fifth terminals 110 and 116, respectively, of the coil 106. When the movable contact 102 is connected to the fifth stationary contact 100 in the switching circuit 90 and accordingly the movable contact 128 is connected to the first stationary contact 118 in the inductance compensation circuit 104, then all the induction heating coils 82 and 88 are disconnected from the current source 64, and the coil 106 of the inductance compensation circuit 104 is energized along its full length so that the induction heating unit remains inoperative. The inductance of the coil 106 of the inductance compensation circuit 104 becomes maximum when all the induction heating coils are deenergized and is decreased stepwise as the power output of the induction heating unit is increased whereby the sum of the inductances of the coil 106 and the material to be heated is maintained substantially constant.

It is known that the power output P of induction heating is expressed by a formula:

$$P = k(N \cdot I)^2 R \cdot A,$$

where
   $k$: the coefficient of inductive coupling between an induction heating coil and a material to be heated;
   $N$: the number of turns of the induction heating coil per unit area of the material to be heated;
   $I$: the current supplied to the induction heating coil;
   $R$: the high-frequency resistance of the material to be heated;
   $A$: the effective area of the material to be heated.

From this it will be understood that the power output of the induction heating unit of the nature above described can be readily selected by varying the number of turns of the induction heating coil per unit area of the material to be heated. The change in the number of turns of the coil is achieved in the coil arrangement of the above described nature by varying the current density effective on the material to be heated through selective actuation of the induction heating coils and scheduled adjustment of the inductance of the inductance compensating coil. Provision of the inductance compensation circuit is, moreover, conductive to maintaining substantially constant the inductance of the induction heating unit as a whole and accordingly the oscillating frequency of the high-frequency current source.

Figure 7:
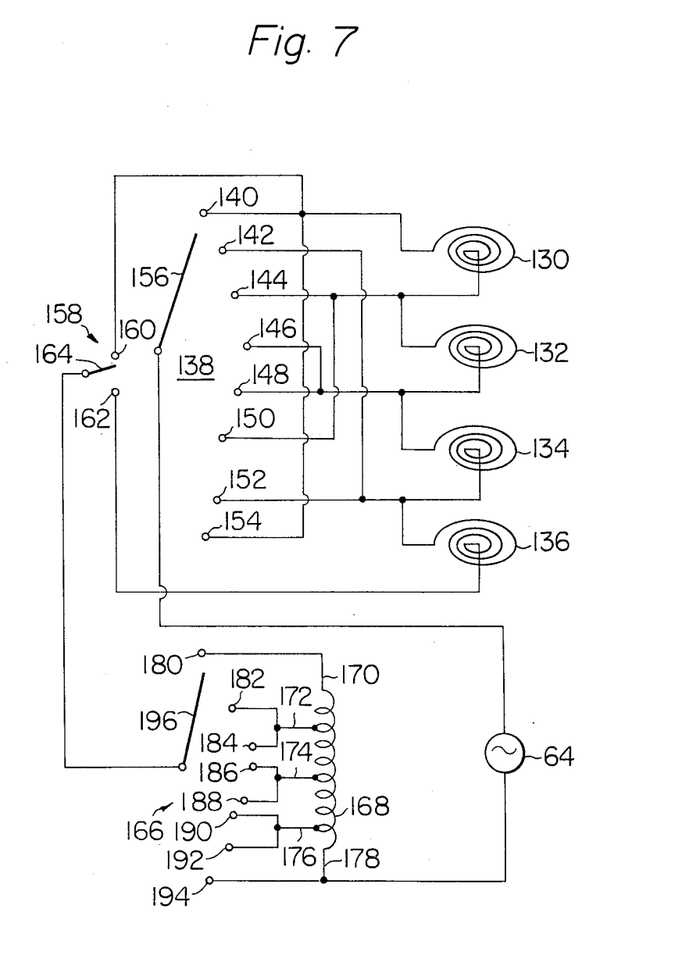
FIG. 7 is a schematic view showing a circuit arrangement of a third preferred example of an induction heating unit.

A modification of the coil arrangement above described is illustrated in FIG. 7. Referring to FIG. 7, the coil arrangement comprises first, second, third and fourth induction heating coils 130, 132, 134 and 136, respectively, which have substantially equal diameters and which are arranged in concentrical and vertically superposed relation, similarly to the coil arrangement shown in FIG. 5. As is the case with the coil arrangement shown in FIG. 5, the coils 130, 132, 134 and 136 are herein assumed to be vertically positioned from the top to the bottom in this sequence with the first coil 130 positioned at the top. The coils 130 to 136 are connected in series to each other.

A first switching circuit 138 is provided which comprises first to eighth stationary contacts 140 to 154 and a movable contact 156 positioned engageably with these stationary contacts. The first and eighth stationary contacts 140 and 154 are connected to the lead of the first induction heating coil 130. The second and seventh stationary contacts 142 and 152 are connected to the line interconnecting the third and fourth induction heating coils 134 and 136. The third and sixth stationary contacts 144 and 150, respectively, are connected to the line interconnecting the first and second induction heating coils 130 and 132. The fifth and fourth stationary contacts 148 and 146 are connected to the line interconnecting the second and third induction heating coils 132 and 134.

A second switching circuit 158 comprises first and second stationary contacts 160 and 162 and a movable contact 164 which is positioned engageably with these stationary contacts 160 and 162. The first stationary contact 160 is connected to the lead of the first induction heating coil 130 and accordingly to the first and eighth stationary contacts 140 and 154 of the first switching circuit 138, while the second stationary contact 162 is connected to the lead of the fourth induction heating coil 136. The movable contacts 156 and 164 of the first and second switching circuits 138 and 158, respectively, are connected to each other across a high-frequency oscillating current source 64 of the previously described nature and an inductance compensation circuit 166.

The inductance compensation circuit 166 comprises a coil 168 from which first to fifth terminals 170 to 178 are led. The first and fifth terminals 170 and 178 are led from opposite ends of the coil 168 while the third terminal 174 is led from an intermediate or substantially central point of the coil 168. The second terminal 172 is led from a point intervening between the first and third terminals 170 and 174, respectively, while the fourth terminal is connected to a point intervening between the third and fifth terminals 174 and 178, respectively, of the coil 168. The first terminal 170 is connected to a first stationary contact 180, the second terminal 172 connected to second and third stationary contacts 182 and 184, the third terminal 174 connected to fourth and fifth stationary contacts 186 and 188, the fourth terminal 176 connected to sixth and seventh stationary contacts 190 and 192, and the fifth terminal 178 connected to an eighth stationary contact 194 and to the high-frequency oscillating current source 64. The first to eighth stationary contacts 180 to 194 are engageable with a movable contact 196 which is connected to the movable contact 164 of the second switching circuit 158.

The movable contact 156 of the first switching circuit 138 is mechanically interlocked with the movable contact 164 of the second switching circuit 158 and the movable contact 196 of the inductance compensation circuit 166 in the following manner:

a. When the movable contact 156 is connected to the first to eighth stationary contacts 140 to 154 in the first switching circuit 138, then the movable contact 196 is connected to the first to eighth stationary contacts 180 to 194, respectively, in the inductance compensation circuit 166.

b. When the movable contact 156 is connected to any one of the first, third, fifth and seventh stationary contacts 140, 144, 148 and 152 in the first switching circuit 138, then the movable contact 164 is connected to the first stationary contact 160 in the second switching circuit 158.

c. When the movable contact 156 is connected to any one of the second, fourth, sixth or eighth stationary contacts 142, 146, 150 and 154 in the first switching circuit 138, then the movable contact 164 is connected to the second stationary contact 162 in the second switching circuit 158.

As a result of such switching actions, the induction heating coils 130, 132, 134 and 136 are selectively energized and de-energized under the schedules which are tabulated below.

| Selected stationary contact in first switching circuit | 140 | 142 | 144 | 146 | 148 | 150 | 152 | 154 |
|---|---|---|---|---|---|---|---|---|
| Selected stationary contact in second switching circuit | 160 | 162 | 160 | 162 | 160 | 162 | 160 | 162 |
| Selected stationary contact in inductance comp. circuit | 180 | 182 | 184 | 186 | 188 | 190 | 192 | 194 |
| Coils 130 | OFF | OFF | ON | OFF | ON | OFF | ON | ON |
| 132 | OFF | OFF | OFF | OFF | ON | ON | ON | ON |
| 134 | OFF | OFF | OFF | ON | OFF | ON | ON | ON |
| 136 | OFF | ON | OFF | ON | OFF | ON | OFF | ON |

From the above table it will be understood that different spacings are available between the coil or coils and the material to be heated even through the same number of coil or coils are energized. When, for example, only one coil is energized as in the case where the stationary contact 142 or 144 is engaged in the first switching circuit 138, a larger spacing is provided between the lowermost coil 136 and the material to be heated than the spacing provided by the uppermost coil 130. Likewise, when two coils are energized as in the case where the stationary contact 146 or 148 is engaged in the first switching circuit 138, a larger spacing is provided between the combination of the lower two coils 134 and 136 and the material to be heated than the spacing provided by the combination of the upper two coils 130 and 132. The same discussion applies to the case where stationary contact 150 or 152 is engaged in the first switching circuit 138 so that the combination of the lower three coils 132, 134 and 136 or the combination of the upper three coils 130, 132 and 134. Thus, different power outputs can be achieved depending upon the vertical position or positions of the coil or coils even though the same number of coil or coils may be energized.

The induction heating coils have been assumed as connected in series in the examples of the coil arrangement thus far described but, where desired, the coils may be connected in parallel to the high-frequency oscillating current source. Where the induction heating coils are connected in parallel, a problem may be raised in which the power output of the heating unit tends to be unstable as a result of the interference between the individual coils. Such a problem will be solved by virtue of the arrangement illustrated in FIG. 8. In the circuit arrangement herein shown, the elements having their counterparts in the circuit arrangement of FIG. 1 are designated by like reference numerals. Combination in series of resonance capacitors 42a and 42b and induction heating coils 44a and 44b are connected in parallel between the positive and negative bus lines 28 and 32, respectively. The combination of the resonance capacitor 42a and the coil 44a is shunted by a commutating capacitor 200a and the combination of the filter capacitor 42b and the coil 44b is shunted by a commutating capacitor 22b. The commutating capacitors 200a and 200b are connected in parallel to the commutating capacitor 38 by switches 202a and 202b, respectively. A node between the filter capacitor 42a and the coil 44a is connected over switches 204a and 204b to a node between the filter capacitor 42b and the coil 44b.

Figure 8:
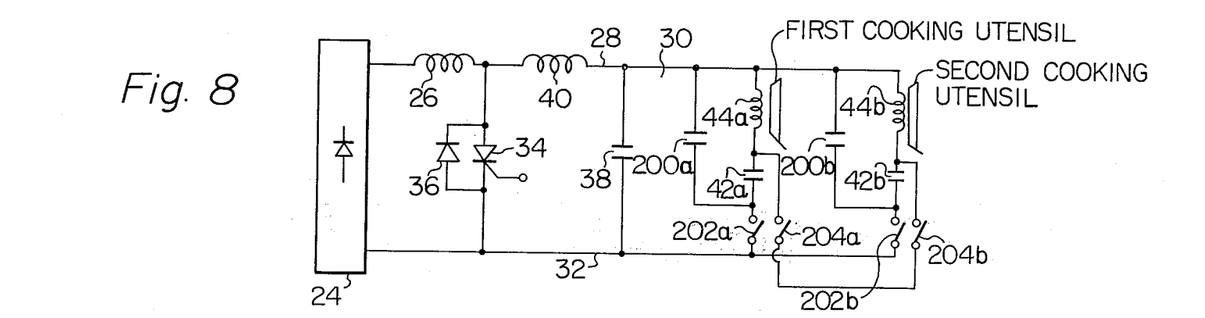
FIG. 8 is a schematic view showing a modification of the circuit arrangement illustrated in FIG. 1.

When, now, a d.c. voltage is impressed on the inverter 30 and simultaneously the silicon controlled rectifier 34 is triggered through its gate terminal, the inverter 30 becomes operative so as to energize the induction heating coils 44a and 44b with a high-frequency current having a frequency dictated by the cycles of the trigger signals applied to the silicon controlled rectifier 34. The high-frequency current thus flowing through the induction heating coils 44a and 44b are dictated by the voltages across the terminal electrodes of the commutating capacitor 38 and the additional commutating capacitors 200a and 200b and the impedance produced by the series-parallel connection of the resonance capacitors 42a and 42b. It therefore follows that the high-frequency current supplied to the induction heating coils 44a and 44b can be maintained substantially constant irrespective of the switching actions of the switches 202a, 202b, 204a and 204b provided the capacitances of the resonance capacitors 42a and 42b and the additional commutating capacitors 200a and 200b and the inductances of the induction heating coils 44a and 44b are properly selected. The power output of each of the induction heating coils 44a and 44b can therefore be maintained unchanged even when one of the coils is de-energized or energized while the other coil is being in an energized condition. It is apparent that such an effect can be achieved even though the induction heating unit consists of an increased number of coils.

While the power output of the induction heating unit has been assumed to be controlled by an electrical approach in the examples of the heating unit thus far described, the power output of the unit may be controlled in a mechanical fashion moving the induction heating coil or coils toward or away from the material to be heated, an example of such an arrangement being illustrated in FIG. 9.

Figure 9A:
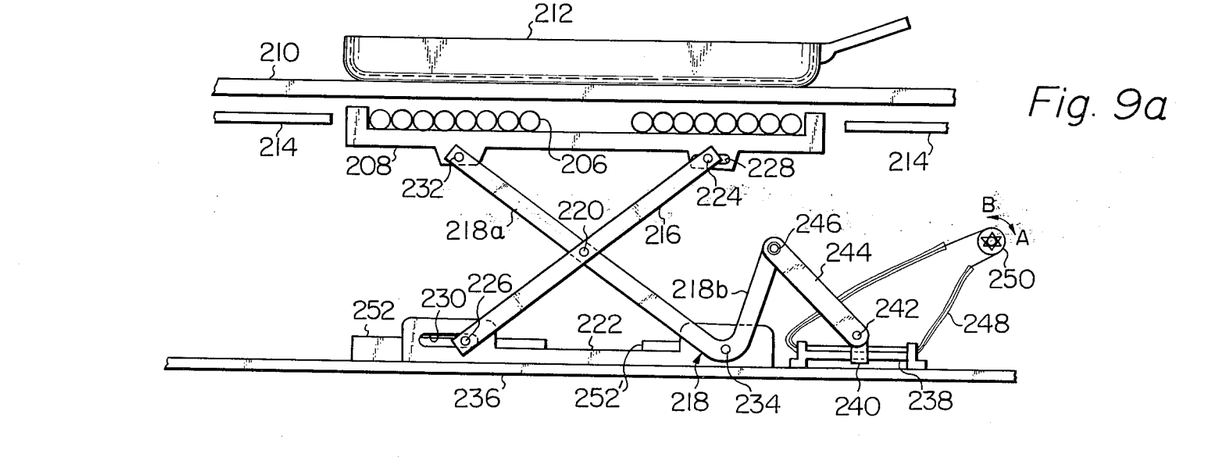
FIG. 9a is a side elevation view, partly in section, of a mechanical arrangement for moving an induction heating coil of an induction heater embodying the present invention.

Referring to FIG. 9a, at least one induction heating coil 206 rests on a horizontal coil supporting plate 208 which is positioned underneath a cooking plate 210 of a heat-resistive insulator. The cooking plate 210 is held in position by suitable support means (not shown) for carrying thereon an object to be heated, such as for example a frying pan 212. The supporting plate 208 may be surrounded at a spacing by a frame 214 of non-magnetic material. First and second levers or moving frameworks 216 and 218 of a heat-resistive insulator or non-magnetic material are pivotally connected together by a pivotal pin 220 at their respective intermediate points and are supported on a support member 222. The first lever 216 carries at its upper and lower ends cross pins 224 and 226 which are slidably received in horizontally elongate slots 228 and 230 formed in the coil supporting plate 208 and the lever support member 222, respectively. The second lever 218 is a bell-crank lever having long and short arms 218a and 218b respectively, which merge with each other through a lowermost turning portion. The bell-crank lever 218 is pivotally connected at the upper end 232 of its long arm 218a to the coil supporting plate 208 and at its lowermost turning portion 234 to the lever support member 222. It is, in this instance, important that the length between the cross pins 224 and 226 of the first lever 216 is substantially equal to the length between the pivotal points 232 and 234 of the second or bell-crank lever 218 and that the lever 216 and the long arm 218a of the lever 218 is substantially symmetrical with respect to the pivotal pin 220 whereby the coil supporting plate 208 is constantly maintained parallel to the underlying lever support member 222. The lever support member 222 is mounted on a base plate 236 of preferably a non-magnetic material.

A guide rail 238 is fixedly mounted on the base plate 236 and carries thereon a slider 240 which is free to longitudinally move on the guide rail 238. The slider 240 is pivotally connected as at 242 to an arm 244 which is further pivotally connected as at 246 to the upper end of the short arm 218b of the bell-crank lever 218 previously mentioned. A flexible line 248 such as a wire or a rope is anchored to the slider 240 and is moved in either direction by means of a knob 250. The knob 250 is herein assumed to be rotatable in the direction of arrow A or B so as to move the slider 240 along the guide rail 238.

Where the base plate 236 is formed of a non-magnetic material as previously mentioned, elongate members 252 and 252' of ferromagnetic material may be positioned on the base plate 236 for the reason to be explained.

In order that the power input supplied to the object to be heated such as the frying pan 212 as shown be decreased, the spacing between the cooking plate 208 and the induction heating coil 206 may be increased. This is achieved through manipulation of the knob 250. When, thus, the knob 250 is rotated in the direction of arrow A, the slider 240 is moved leftwardly of the drawing on the guide rail 238 by the wire or rope 248 so that the arm 244 turns clockwise of the drawing about the pivot 240 and accordingly the pivotal connection between the arm 244 and the short arm 218b of the bell-crank lever 218 is raised. The long arm 218a of the bell-crank lever 218 is consequently turned counter-clockwise of the drawing about the lowermost pivotal point 234 and simultaneously the lever 216 turns clockwise about the pivotal pin 220 with its upper and lower ends 224 and 226 sliding in the elongate slots 228 and 230, respectively. The coil supporting plate 208 is thus lowered while maintaining its parallel relation to the base plate 236 so that an increased spacing is provided between the induction heating coil 206 and the frying pan 212. As the induction coil 206 lowers, it approaches the base plate 236 of the non-magnetic metal positioned at the bottom so that an increasing amount of magnetic flux permeates the base plate 236. The elongate members 252 and 252' placed on the base plate 236 prevent the base plate from being heated by the magnetic flux that would otherwise pass therethrough. The base plate 236 is provided for the purpose of minimizing the variation in the inductance of the induction heating coil 206.

To raise the induction heating coil 206, the knob 250 should be turned in the direction of arrow B so that the slider 240 is moved on the guide rail 238 rightwardly of the drawing. The coil supporting plate 208 will be raised by the actions of the levers 216, 218 and 244 reverse to those described above.

Figure 9B:
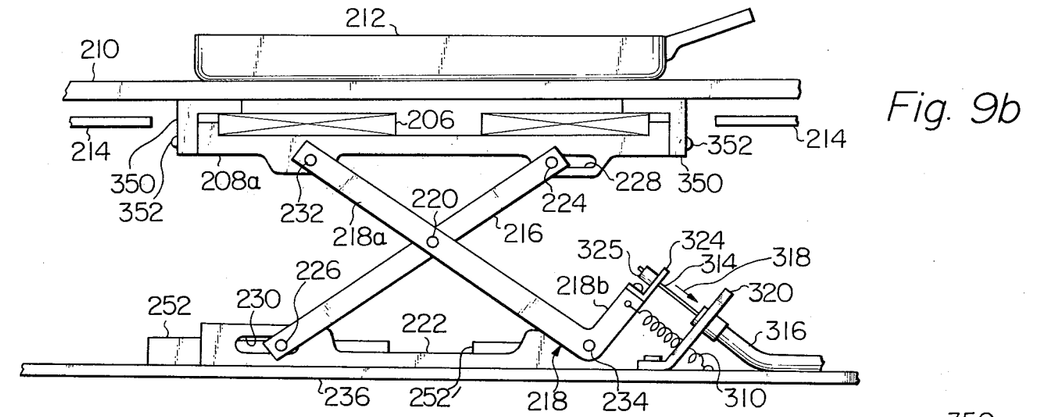
FIG. 9b is a modification of FIG. 9a and shows a side elevation view, partly in section, of a mechanical arrangement for moving an induction heating coil of an induction heater embodying the present invention.
Figure 9C:
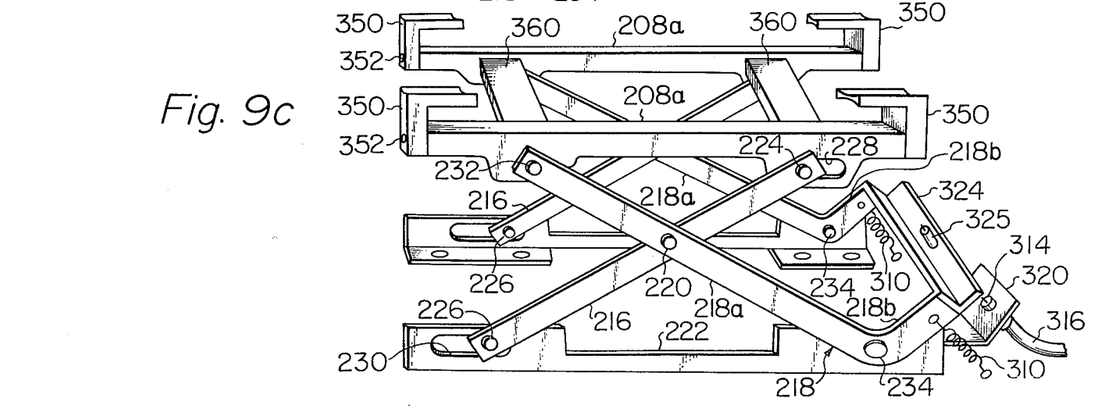
FIG. 9c is a perspective view of FIG. 9b wherein an induction coil is removed.

A modification of FIG. 9a is shown in FIGS. 9b and 9c wherein like reference numerals are used to indicate the same parts of FIG. 9a, and wherein illustrations about the same parts made in connection with FIG. 9a will be omitted for clarity. As shown, two horizontal coil supporting members 208a are provided at the upper portion of the first and second levers or moving frameworks 216 and 218, and connected by two connecting plates 360. At each of the opposite ends of the coil supporting member 208a, provided is a coil holding member 250 fixed thereto by a suitable fixing member such as a volt 352. The coil holding member 350 has surfaces curved inward as shown in FIG. 9c. The purpose of such a configuration is to get a high efficiency of heat diffusion. It is to be noted that the shape of the coil holding member 350 is not restricted to the above and may be formed in a character "H" for example. The coil holding member 350 also serves to arrange with space between the cooking plate 210 and the heating coil 206 in order that the latter does not contact with the former. The coil supporting plates 208a are always pushed down by the weight of the induction heating coil 206. Therefore, to lift the induction heating coil 206 for generating more output energy in the frying pan 212, the short arm 218b of the bellcrank lever 218 is pulled in the direction of an arrow 318 by a flexible line 314 such as a wire or a rope. The flexible line 314 is covered by a suitable tubular guide 316 fixed to a supporting member 320 at one end thereof. On the contrary, to lower the induction heating coil 206, the flexible line 314 is slakened out. The flexible line 134 is fixed at one end thereof to the short arm 218b by means of suitable member 324 and 325 as shown, and the other end thereof is connected to a suitable means for remote control (not shown). Thus, the means for remote control can control the position of the induction heating coil 206 over the flexible line 314 as mentioned above. Furthermore, to make easy for the means for remote control to hold a balance of the coil supporting members 208a, there are provided two coil springs 310 one end of which is fixed to the base plate 236 and at the other end thereof to the short arm 218b.

Figure 10:
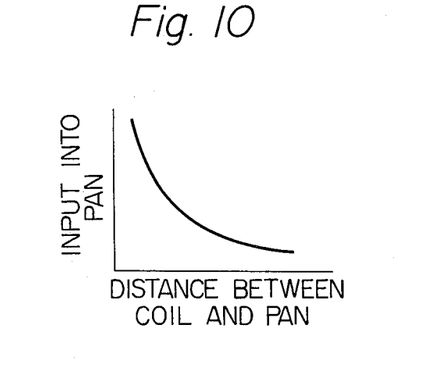
FIG. 10 is a graph showing an example of the relationship of the distance between an induction heating coil and a pan to be heated to power input to the pan.
Figure 11:
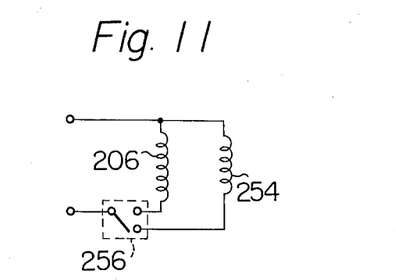
FIG. 11 is a schematic view showing a switching circuit which is applicable to the mechanical arrangement shown in FIG. 9.

FIG. 10 illustrates an example of the relationship of the distance between the induction heating coil and the material to be heated to the power input supplied to the material. As seen from the curve herein shown, the power input on the material to be heated can not be reduced to zero unless the coil is spaced apart an infinite distance from the material to be heated. FIG. 11 shows an improved coil arrangement to avoid such an inconvenience. Referring to FIG. 11, the induction heating coil 206 and a dummy-coil 254 are connected in parallel to the high-frequency current source, not shown, through a two way switch 256. The switch 256 is automatically usually by s suitable means held in a position to connect the induction heating coil 206 to the high-frequency current source but, when the coil 206 is moved to its lowermost position through manipulation of the knob 250 in the arrangement of FIG. 9, then the switch is shifted to a position to disconnect the induction heating coil 206 from the high-frequency current source and, in turn, to connect the dummy-coil 254 to the current source so that the power input into the material to be heated is reduced to zero.

Figure 12:
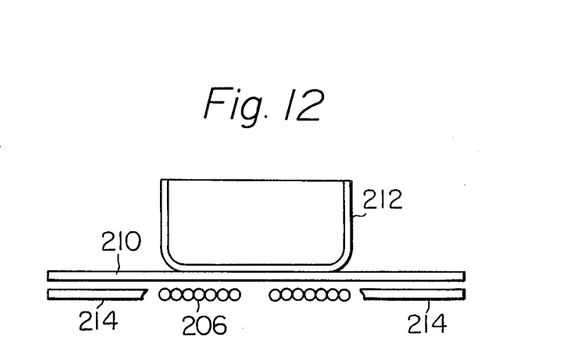
FIG. 12 is a sectional view of a preferred example of a mechanical arrangement of an induction heating unit of the equipment according to the present invention.

FIG. 12 illustrates a modification of the induction heating unit shown in FIG. 9. Referring to FIG. 12, the cooking plate 210 is formed of a ceramic plate of heat-resistive or crystal glass. The induction heating coil 206 is, in this instance, preferably so arranged as to cover substantially the total bottom area of the material such as the pan 212 to be heated. The induction heating coil 206 is surrounded at a spacing of, for example 20 mm by a frame 214 of a non-magnetic material such as aluminum. When the induction heating coil 206 is energized, then an eddy current is produced in the pan 212 which is consequently heated by Joule heat. Since, in this instance, the frame 214 is formed of a non-magnetic material as mentioned above, the flux distribution is such that the magnetic flux "bypasses" the frame 214. When the pan 212 is not mounted on the cooking plate 210, the inductance and accordingly the inpedance of the induction heating coil 206 are smaller in the presence of the non-magnetic frame 214 than in the absence of the frame. In other words, the nearer the non-magnetic frame 214 is positioned to the induction heating coil 206, the smaller the impedance of the coil and the larger the current passing through the coil. Where, in particular, the silicon controlled rectifier is incorporated in the inverter as previously mentioned with reference to FIG. 1, the effectiveness of the magnetic frame 214 will be pronounced.

Figure 13:
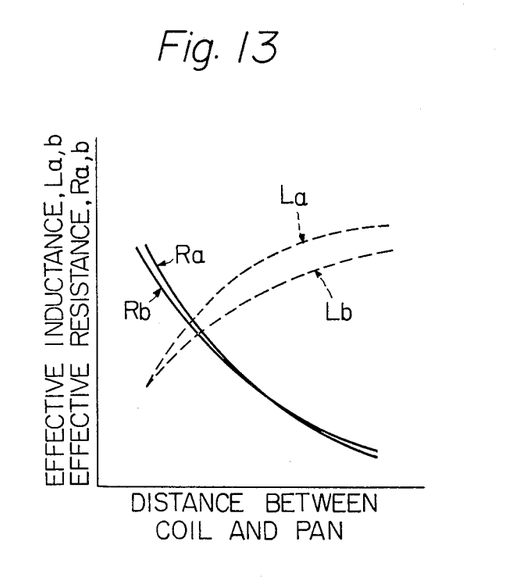
FIG. 13 is a graph showing examples of the variations in the effective inductance and resistance of an induction heating coil when the distance between the coil and a pan is varied.

The effective inductance L and the effective resistance R of the induction heating coil vary with the distance between the coil and the material to be heated as indicated in FIG. 13, wherein the suffix $a$ indicates the values obtained in the absence of the non-magnetic frame and the suffix $b$ indicates those obtained in the presence of the frame. As will be seen from the curves herein shown, the effective inductance $Lb$ varies at a smaller rate than that of the variation of the effective inductance $La$ although the effective resistance varies at a rate substantially unrelated to the presence or absence of the non-magnetic frame. Thus, the effectiveness of the non-magnetic frame is practically negligible where the coil is positioned close to the material to be heated but, when the coil is spaced apart a greater distance from the material to be heated, the effectiveness of the non-magnetic frame comes into play so that the effective inductance of the induction heating coil increases only at a limited rate. In the circuit arrangement shown in FIG. 1 or 8, the commutation capacitor 38 can be regarded as a source of high-frequency voltage as previously mentioned whilst the resonance capacitor 42 and the induction heating coils constitute an oscillation circuit in series to the high-frequency voltage source. When the material to be heated is moved closer to the induction heating coil, the effective inductance of the coil decreases as seen in FIG. 13 so that the oscillating frequency of the oscillation circuit comprising the resonance capacitor 42 (FIG. 1 or 8) and the induction coil in series varies toward the high-frequency voltage source provided by the commutating capacitor 38 (FIG. 1 or 8) whereby the current supplied to the induction coils increases. When the coil is moved closer to the material to be heated, the current flowing through the coil increases. If the non-magnetic frame is positioned nearer the induction heating coil, the current flowing through the coil increases at a relatively low rate, because of the limited rate of increase of the effective inductance of the coil. When, in the induction heating unit having two coils, one coil is heated in the presence of a material to be heated and the other coil is energized under no-load conditions, a constant current flows through the former and, if a material to be heated is moved closer to the latter, the current flowing through the coil increases but, if the non-magnetic frame is moved nearer the coils, the current flowing through the coils vary at limited rates because of the limited rate of increase of the effective inductance and accordingly the limited rate of increase of the impedance of each coil.

Figure 14:
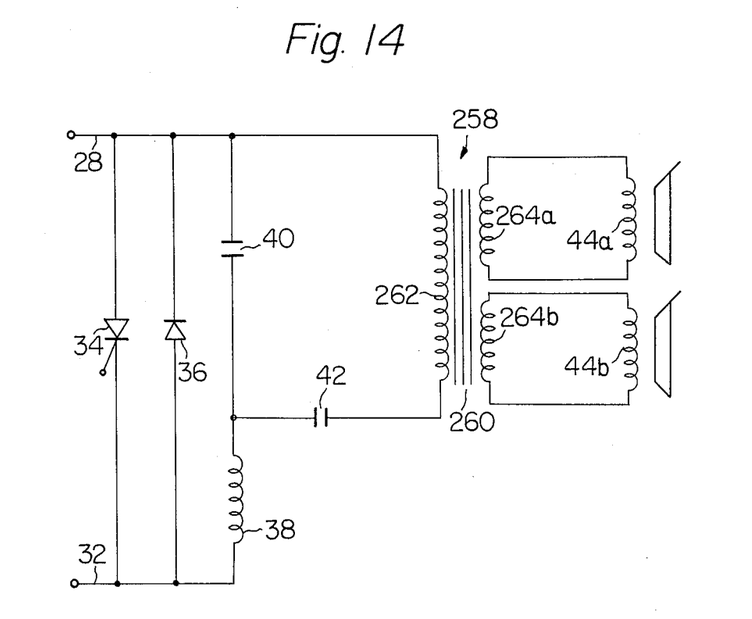
FIG. 14 is a schematic view showing a circuit arrangement of a fourth preferred example of an induction heating unit of the equipment according to the present invention.

FIG. 14 illustrates still another preferred example of the induction heating unit of the heater according to the present invention, wherein elements having their counterparts in the arrangement of FIG. 8 are designated by like reference numerals. The induction heating unit herein shown is adapted to control the power input on a material to be heated by the use of a current transformer which is generally designated by reference numeral 258. The current transformer 256 comprises a core 260, a primary coil 262, and first and second secondary coils 264a and 264b. The primary coil 262 is connected in series to the commutating capacitor 40 and the resonance capacitor 42 so as to provide a closed loop. The first and second secondary coils 264a and 264b are connected to the first and second induction heating coils 44a and 44b, respectively, which in this instance are illustrated as connected in series. The primary coil 262 is thus supplied with a high-frequency oscillating current from the commutating capacitor 40 so that the induction heating coils 44a and 44b receive high-frequency currents from the secondary coils 264a and 264b, respectively. The coefficients of coupling between the primary coil 262 and the first secondary coil 264a and between the primary coil 262 and the second secondary coil 264b are variable independently of each other so that the input currents supplied from the secondary coils 264a and 264b to the induction heating coils 44a and 44b can be varied. The coefficients of coupling may be varied in numerous manners by, for example, varying the spacings between the primary coil 262 and the secondary coils 264a and 264b or the diameters of the wires forming the individual coils, or through adjustment of the core 260.

The induction heating unit above described is thus characterized in that the principle of operation of the current transformers is applied to the control of the induction heating coils so that the inputs on the induction heating coils can be varied independently without effecting each other.

What is claimed is:

1. An induction heating appliance for inductively heating a cooking utensil comprising, in combination: a cooking plate on which the cooking utensil is to be placed; induction heating means mounted below said cooking plate for generating an alternating magnetic field to heat the cooking utensil; an inverter means connected to said induction heating means to energizing same; a non-magnetic plate; a pantograph type device deposited on said non-magnetic plate; a coil supporting means for substantially horizontally mounting said induction means thereon, said coil supporting means being fixedly secured on said pantograph type device to be vertically moved thereby in parallel relationship relative to said cooking plate; control means for adjusting a vertical position of said coil supporting means, said control means including a flexible line, which is connected to at least one framework of said pantograph type device, said flexible line serving to adjust the vertical position of said coil supporting means in that it may be pulled to raise said pantograph type device and may be relaxed to lower said pantograph type device due to the weight of said induction heating means; a dummy coil connected in parallel to said induction heating coil, and switching means for normally connecting said induction heating means to said inverter means and for disconnecting the induction heating means from said inverter means and connecting said dummy coil to said inverter means for preventing heating of said cooking utensil when said induction heating means is moved to its lowermost position by said pantograph type device.

2. An induction heating appliance according to claim 1, wherein said coil supporting means includes a plurality of coil holding members for partly holding down said induction heating means relative to said coil supporting means to avoid contact between said cooking plate and said induction heating coil whenever said pantograph type device is raised to its uppermost position.

3. An induction heating appliance according to claim 1, wherein said coil supporting means and said pantogragh type device are formed of heat-resisting and electrically insulating material.

4. An induction heating appliance according to claim 3, wherein said plurality of said coil holding members each is configured for high efficiency of heat diffusion, partly holding down said induction heating means and partly contacting said cooking plate whenever said pantograph type device is raised to the uppermost position.

5. An induction heating appliance according to claim 1, wherein said pantograph type device is made of non-magnetic material.

6. An induction heating appliance according to claim 1, further including at least one ferromagnetic member positioned on said non-magnetic plate for compensating a reduction of impedance of said induction heating means due to said non-magnetic plate when said induction heating means is lowered to its lowermost position by said pantograph type device.

7. An induction heating appliance for inductively heating cooking utensils comprising, in combination: a cooking plate on which at least one cooking utensil is to be placed; induction heating means mounted below said cooking plate for generating an alternating magnetic field to heat the cooking utensil; rectifying means to rectify alternating current; an inverter unit having a gate-controlled rectifier and a diode which are connected in parallel to said rectifying means; a gating circuit connected to a gate terminal of said gate-controlled rectifier; a filter inductor interposed between said rectifying means and said inverter unit; a series resonance circuit having a capacitor and an induction element which are connected in parallel to said inverter unit; a filter capacitor connected in series with said induction heating means to form a first combination which is connected in parallel with said series resonance circuit and driven thereby; wherein said induction heating means includes a plurality of spiral coils; wherein said induction cooking appliance includes inductive circuit compensating means connected in series with said induction heating means for compensating variations of inductance thereof; at least first and second switching means, said first switching means being adapted to connect selectively said spiral coils to said series resonance circuit and said second switching means being interlocked with said first switching means to vary selectively inductance of said inductance compensating means to effect compensation for variations of inductance of said induction heating means; and wherein said plurality of spiral coils are arranged substantially concentrically and vertically, each of the junctions of said plurality of spiral coils are provided with at least two taps which are connected to said first switching means, and said induction cooking appliance further includes at least one on-off switch interlocked with said first switching means and connected through two stationary contacts thereof across said induction heating means and through a movable contact thereof to said second switching means.

8. An induction cooking appliance according to claim 7, wherein said plurality of spiral coils are arranged substantially concentrically and coplanar, have a plurality of taps each provided at each of the junctions of said plurality of spiral coils and are connected to said first switching means for allowing said induction heating means to be selectively energized.

9. An induction cooking appliance according to claim 7, wherein said plurality of spiral coils are arranged substantially concentrically and vertically, comprise a plurality of taps each provided at each of the junctions of said plurality of spiral coils and are connected to said first switching means for allowing said induction heating means to be selectively energized.

10. An induction cooking appliance for inductively heating cooking utensils comprising, in combination: a cooking plate on which at least one cooking utensil is to be placed; induction heating means mounted below said cooking plate for generating an alternating magnetic field to heat the cooking utensil; rectifying means to rectify alternating current; an inverter unit having a gate-controlled rectifier and a diode which are connected in parallel to said rectifying means; a gating circuit connected to a gate terminal of said gate-controlled rectifier; a filter inductor interposed between said rectifying means and said inverter unit; a series resonance circuit having a capacitor and an induction element which are connected in parallel to said inverter unit; a filter capacitor connected in series with said induction heating means to form a first combination which is connected in parallel with said series resonance circuit and driven thereby; wherein said induction heating means includes a plurality of spiral coils; wherein said induction cooking appliance includes inductive circuit compensating means connected in series with said induction heating means for compensating variations of inductance thereof; and at least first and second switching means, said first switching means being adapted to connect selectively said spiral coils to said series resonance circuit and said second switching means being interlocked with said first switching means to vary selectively inductance of said inductance compensating means to effect compensation for variations of inductance of said inductance heating means; and wherein said induction cooking appliance further comprises a second combination in series with another induction heating means and another filter capacitor, said first and second combinations each being connected in parallel with said series resonance circuit, a first on-off switch is interposed between said induction heating means and said filter capacitor, a second on-off switch is interposed between said another induction heating means and said another filter capacitor, a third on-off switch is interposed between intermediate junctions of respective said first and second combinations, and two commutating capacitors respectively shunt said first and second combinations.

* * * * *